(12) United States Patent
Lindholm et al.

(10) Patent No.: US 7,755,636 B1
(45) Date of Patent: Jul. 13, 2010

(54) SYSTEM, METHOD AND ARTICLE OF MANUFACTURE FOR A PROGRAMMABLE PROCESSING MODEL WITH INSTRUCTION SET

(75) Inventors: John Erik Lindholm, Cupertino, CA (US); David B. Kirk, Santa Clara, CA (US); Henry P. Moreton, Woodside, CA (US); Simon Moy, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 11/942,582

(22) Filed: Nov. 19, 2007

Related U.S. Application Data

(60) Division of application No. 11/680,125, filed on Feb. 28, 2007, now Pat. No. 7,697,008, which is a division of application No. 09/586,249, filed on May 31, 2000, now Pat. No. 7,209,140, which is a continuation-in-part of application No. 09/456,102, filed on Dec. 6, 1999, now Pat. No. 6,353,439.

(51) Int. Cl.
G09G 5/00 (2006.01)
G06T 15/50 (2006.01)
G06T 1/00 (2006.01)
G06F 15/00 (2006.01)

(52) U.S. Cl. .................. 345/582; 345/426; 345/418; 345/419; 345/506

(58) Field of Classification Search .................. 345/506
See application file for complete search history.

(56) References Cited

U.S. PATENT DOCUMENTS

| | | | |
|---|---|---|---|
| 5,025,407 A | 6/1991 | Gulley et al. | 364/754 |
| 5,179,647 A | 1/1993 | Chang | 395/142 |
| 5,222,202 A | 6/1993 | Koyamada | 395/123 |
| 5,289,577 A | 2/1994 | Gonzales et al. | 345/506 |
| 5,341,324 A | 8/1994 | Matsumoto et al. | 365/51 |
| 5,459,820 A | 10/1995 | Schroeder et al. | 395/120 |
| 5,694,143 A | 12/1997 | Fielder et al. | 345/112 |
| 5,701,479 A | 12/1997 | Venable et al. | 718/100 |
| 5,724,561 A | 3/1998 | Tarolli et al. | 395/523 |

(Continued)

FOREIGN PATENT DOCUMENTS

EP    0 690 430 A2    1/1996

(Continued)

OTHER PUBLICATIONS

Office Action Summary from U.S. Appl. No. 11/680,125 mailed on Feb. 19, 2009.

(Continued)

*Primary Examiner*—M Good Johnson
(74) *Attorney, Agent, or Firm*—Zilka-Kotab, PC

(57) ABSTRACT

A system, method and article of manufacture are provided for programmable processing in a computer graphics pipeline. Initially, data is received from a source buffer. Thereafter, programmable operations are performed on the data in order to generate output. The operations are programmable in that a user may utilize instructions from a predetermined instruction set for generating the same. Such output is stored in a register. During operation, the output stored in the register is used in performing the programmable operations on the data.

19 Claims, 4 Drawing Sheets

U.S. PATENT DOCUMENTS

| | | | | |
|---|---|---|---|---|
| 5,740,383 | A | 4/1998 | Nally et al. | 395/296 |
| 5,764,228 | A | 6/1998 | Baldwin | 715/797 |
| 5,801,711 | A | 9/1998 | Koss et al. | 345/441 |
| 5,808,619 | A | 9/1998 | Choi et al. | 345/426 |
| 5,838,337 | A | 11/1998 | Kimura et al. | 345/519 |
| 5,838,377 | A | 11/1998 | Greene | 348/398 |
| 5,880,736 | A | 3/1999 | Peercy et al. | 345/426 |
| 5,886,701 | A | 3/1999 | Chauvin et al. | 345/418 |
| 5,949,424 | A | 9/1999 | Cabral et al. | 345/426 |
| 5,956,042 | A | 9/1999 | Tucker et al. | 345/426 |
| 5,963,210 | A | 10/1999 | Lewis et al. | 345/419 |
| 5,974,168 | A | 10/1999 | Rushmeier et al. | 382/141 |
| 5,977,997 | A | 11/1999 | Vainsencher | 345/519 |
| 5,995,996 | A | 11/1999 | Venable | 718/100 |
| 6,000,027 | A | 12/1999 | Pawate et al. | 712/39 |
| 6,014,144 | A | 1/2000 | Nelson et al. | 345/426 |
| 6,016,151 | A | 1/2000 | Lin | 345/430 |
| 6,046,747 | A | 4/2000 | Saunders et al. | 345/582 |
| 6,057,855 | A | 5/2000 | Barkans | 345/435 |
| 6,097,395 | A | 8/2000 | Harris et al. | 345/426 |
| 6,104,417 | A | 8/2000 | Nielsen et al. | 345/521 |
| 6,137,497 | A | 10/2000 | Strunk et al. | 345/434 |
| 6,144,365 | A | 11/2000 | Young et al. | 345/153 |
| 6,163,319 | A | 12/2000 | Peercy et al. | 345/426 |
| 6,166,748 | A | 12/2000 | Van Hook et al. | 345/522 |
| 6,173,366 | B1 | 1/2001 | Thayer et al. | 711/129 |
| 6,175,367 | B1 | 1/2001 | Parikh et al. | 345/426 |
| 6,198,488 | B1 | 3/2001 | Lindholm et al. | 345/426 |
| 6,221,883 | B1 | 4/2001 | Baldessarini et al. | 514/317 |
| 6,288,418 | B1 | 9/2001 | Reed et al. | 257/209 |
| 6,304,265 | B1 | 10/2001 | Harris et al. | 345/421 |
| 6,326,964 | B1 | 12/2001 | Snyder et al. | 345/419 |
| 6,342,888 | B1 | 1/2002 | Lindholm et al. | 345/426 |
| 6,347,344 | B1 * | 2/2002 | Baker et al. | 710/20 |
| 6,353,439 | B1 | 3/2002 | Lindholm et al. | 345/561 |
| 6,417,858 | B1 | 7/2002 | Bosch et al. | 345/522 |
| 6,424,343 | B1 | 7/2002 | Deering et al. | 345/419 |
| 6,452,595 | B1 | 9/2002 | Montrym et al. | 345/426 |
| 6,462,737 | B2 | 10/2002 | Lindholm et al. | 345/426 |
| 6,559,842 | B1 * | 5/2003 | Deering et al. | 345/420 |
| 6,577,309 | B2 | 6/2003 | Lindholm et al. | 345/426 |
| 6,577,316 | B2 | 6/2003 | Brethour et al. | 345/505 |
| 6,608,625 | B1 * | 8/2003 | Chin et al. | 345/501 |
| 6,636,214 | B1 | 10/2003 | Leather et al. | 345/422 |
| 6,650,331 | B2 | 11/2003 | Lindholm et al. | 345/522 |
| 6,707,462 | B1 * | 3/2004 | Peercy et al. | 345/619 |
| 6,714,197 | B1 | 3/2004 | Thekkath et al. | 345/427 |
| 6,717,576 | B1 * | 4/2004 | Duluk et al. | 345/419 |
| 6,731,289 | B1 * | 5/2004 | Peercy et al. | 345/503 |
| 6,734,874 | B2 | 5/2004 | Lindholm et al. | 345/643 |
| 6,788,303 | B2 | 9/2004 | Baldwin | 345/522 |
| 6,844,880 | B1 | 1/2005 | Lindholm et al. | 345/506 |
| 6,870,540 | B1 | 3/2005 | Lindholm et al. | 345/522 |
| 6,891,538 | B1 | 5/2005 | Tannenbaum | 345/426 |
| 6,906,716 | B2 | 6/2005 | Moreton et al. | 345/423 |
| 6,947,047 | B1 | 9/2005 | Moy et al. | 345/501 |
| 6,956,042 | B2 | 10/2005 | Bhatti et al. | 514/278 |
| 6,970,206 | B1 * | 11/2005 | Swan et al. | 348/448 |
| 6,975,321 | B1 | 12/2005 | Lindholm et al. | 345/506 |
| 6,983,357 | B2 | 1/2006 | Poff et al. | 712/34 |
| 6,992,667 | B2 | 1/2006 | Lindholm et al. | 345/419 |
| 6,992,669 | B2 | 1/2006 | Montrym et al. | 345/427 |
| 7,002,577 | B2 | 2/2006 | Lindholm et al. | 345/426 |
| 7,002,588 | B1 | 2/2006 | Lindholm et al. | 345/561 |
| 7,009,607 | B2 | 3/2006 | Lindholm et al. | 345/426 |
| 7,010,724 | B1 | 3/2006 | Hicok | 714/39 |
| 7,034,829 | B2 | 4/2006 | Lindholm et al. | 345/427 |
| 7,050,055 | B2 | 5/2006 | Lindholm et al. | 345/426 |
| 7,064,763 | B2 | 6/2006 | Lindholm et al. | 345/506 |
| 7,071,935 | B1 * | 7/2006 | Deering et al. | 345/419 |
| 7,095,414 | B2 | 8/2006 | Lindholm et al. | 345/519 |
| 7,116,333 | B1 * | 10/2006 | Peercy | 345/582 |
| 7,136,070 | B1 | 11/2006 | Papakipos et al. | 345/582 |
| 7,209,140 | B1 | 4/2007 | Lindholm et al. | 345/522 |
| 7,242,414 | B1 | 7/2007 | Thekkath et al. | 345/623 |
| 7,249,306 | B2 | 7/2007 | Chen | 714/758 |
| 7,274,373 | B1 | 9/2007 | Bastos et al. | 345/586 |
| 2003/0025706 | A1 | 2/2003 | Ritter | 345/582 |
| 2006/0031818 | A1 | 2/2006 | Poff et al. | 717/114 |
| 2007/0055967 | A1 | 3/2007 | Poff et al. | 717/162 |

FOREIGN PATENT DOCUMENTS

| | | |
|---|---|---|
| EP | 0 690 430 A3 | 7/1996 |
| JP | 64-026966 | 1/1989 |
| JP | 64/040679 | 2/1989 |
| WO | 98/28695 | 7/1998 |
| WO | 99/52040 | 10/1999 |
| WO | 01/41069 | 6/2001 |
| WO | 01/41073 | 6/2001 |
| WO | 02/43002 | 5/2002 |
| WO | 02/103633 | 12/2002 |

OTHER PUBLICATIONS

Office Action Summary from U.S. Appl. No. 11/680,125 mailed on Apr. 2, 2008.
Office Action Summary from U.S. Appl. No. 11/680,125 mailed on Oct. 8, 2008.
Office Action Summary from U.S. Appl. No. 11/942,577 mailed on Apr. 16, 2009.
Office Action Summary from U.S. Appl. No. 11/942,569 mailed on May 14, 2009.
Final Office Action Summary from U.S. Appl. No. 11/680,125 mailed on Sep. 17, 2009.
Final Office Action summary from U.S. Appl. No. 11/942,569 mailed on Dec. 4, 2009.
Final Office Action summary from U.S. Appl. No. 11/942,577 mailed on Nov. 30, 2009.
International Search Report from PCT Application No. PCT/US00/33043 mailed on Apr. 5, 2001.
Written Opinion from PCT Application No. PCT/US00/33043 mailed on Jan. 11, 2002.
International Preliminary Examination Report from PCT Application No. PCT/US00/33043 mailed on Apr. 8, 2002.
European Search Report from application No. 00982457.4-1522 mailed on Mar. 26, 2004.
Office Action Summary from U.S. Appl. No. 09/775,086 mailed on Apr. 11, 2001.
Office Communication from U.S. Appl. No. 09/775,086 mailed on Aug. 2, 2001.
Office Action Summary from U.S. Appl. No. 09/775,129 mailed on Oct. 6, 2003.
Office Action Summary from U.S. Appl. No. 09/456,102 mailed on Jan. 29, 2001.
Olano, Marc et al., "Triangle Scan Conversion using 2D Homogeneous Coordinates" 1997 SIGGRAPH/Eurographics Worshop, ACM, pp. 89-95.
U.S. Appl. No. 11/942,569, filed Nov. 19, 2007.
U.S. Appl. No. 11/680,125, filed Feb. 28, 2007.
U.S. Appl. No. 11/942,577, filed Nov. 19, 2007.
U.S. Appl. No. 11/286,809, filed Nov. 22, 2005.

* cited by examiner

SYSTEM, METHOD AND ARTICLE OF MANUFACTURE FOR A PROGRAMMABLE PROCESSING MODEL WITH INSTRUCTION SET

RELATED APPLICATION

The present application is a divisional of an application entitled "SYSTEM, METHOD AND ARTICLE OF MANUFACTURE FOR A PROGRAMMABLE PROCESSING MODEL WITH INSTRUCTION SET" filed Feb. 28, 2007 now U.S. Pat. No. 7,697,008 under Ser. No. 11/680,125 which, in turn, is a divisional of an application entitled "SYSTEM, METHOD AND ARTICLE OF MANUFACTURE FOR A PROGRAMMABLE VERTEX PROCESSING MODEL WITH INSTRUCTION SET" filed May 31, 2000 under Ser. No. 09/586,249, now U.S. Pat. No. 7,209,140, which, in turn, is a continuation-in-part of an application entitled "METHOD, APPARATUS AND ARTICLE OF MANUFACTURE FOR A TRANSFORM MODULE IN A GRAPHICS PROCESSOR" filed Dec. 6, 1999 under Ser. No. 09/456,102, now U.S. Pat. No. 6,353,439, which is incorporated herein by reference in its entirety.

FIELD OF THE INVENTION

The present invention relates to computer graphics, and more particularly to providing programmability in a computer graphics processing pipeline.

BACKGROUND OF THE INVENTION

Graphics application program interfaces (API's) have been instrumental in allowing applications to be written to a standard interface and to be run on multiple platforms, i.e. operating systems. Examples of such graphics API's include Open Graphics Library (OpenGL®) and D3D™ transform and lighting pipelines. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports this OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API. On the other hand, one major drawback of this approach is that changes to the graphics API are difficult and slow to be implemented. It may take years for a new feature to be broadly adopted across multiple vendors.

With the impending integration of transform operations into high speed graphics chips and the higher integration levels allowed by semiconductor manufacturing, it is now possible to make part of the geometry pipeline accessible to the application writer. There is thus a need to exploit this trend in order to afford increased flexibility in visual effects. In particular, there is a need to provide a new computer graphics programming model and instruction set that allows convenient implementation of changes to the graphics API, while preserving the driver and hardware optimization afforded by currently established graphics API's.

SUMMARY OF THE INVENTION

A system, method and article of manufacture are provided for programmable processing in a computer graphics pipeline. Initially, data is received from a source buffer. Thereafter, programmable operations are performed on the data in order to generate output. The operations are programmable in that a user may utilize instructions from a predetermined instruction set for generating the same. Such output is stored in a register. During operation, the output stored in the register is used in performing the programmable operations on the data.

By this design, the present invention allows a user to program a portion of the graphics pipeline that handles vertex processing. This results in an increased flexibility in generating visual effects. Further, the programmable vertex processing of the present invention allows remaining portions of the graphics pipeline, i.e. primitive processing, to be controlled by a standard graphics application program interface (API) for the purpose of preserving hardware optimizations.

In one embodiment of the present invention, only one vertex is processed at a time in a functional module that performs the programmable operations. Further, the various foregoing operations may be processed for multiple vertices in parallel.

In another embodiment of the present invention, the data may include a constant and/or vertex data. During operation, the constant may be stored in a constant source buffer and the vertex data may be stored in a vertex source buffer. Further, the constant may be accessed in the constant source buffer using an absolute or relative address.

In still another embodiment of the present invention, the register may be equipped with single write and triple read access. The output may also be stored in a destination buffer. The output may be stored in the destination buffer under a predetermined reserved address.

As an option, the programmable vertex processing of the present invention may include negating the data. Still yet, the programmable vertex processing may also involve swizzling the data. Data swizzling is useful when generating vectors. Such technique allows the efficient generation of a vector cross product and other vectors.

During operation, the programmable vertex processing is adapted for carrying out various instructions of an instruction set. Such instructions may include, but are not limited to a no operation, address register load, move, multiply, addition, multiply and addition, reciprocal, reciprocal square root, three component dot product, four component dot product, distance vector, minimum, maximum, set on less than, set on greater or equal than, exponential base two (2), logarithm base two (2), and/or light coefficients.

These various instructions may each be carried out using a unique associated method and data structure. Such data structure includes a source location identifier indicating a source location of data to be processed. Such source location may include a plurality of components. Further provided is a source component identifier indicating in which of the plurality of components of the source location the data resides. The data may be retrieved based on the source location identifier and the source component identifier. This way, the operation associated with the instruction at hand may be performed on the retrieved data in order to generate output.

Also provided is a destination location identifier for indicating a destination location of the output. Such destination location may include a plurality of components. Further, a destination component identifier is included indicating in which of the plurality of components of the destination location the output is to be stored. In operation, the output is stored based on the destination location identifier and the destination component identifier.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
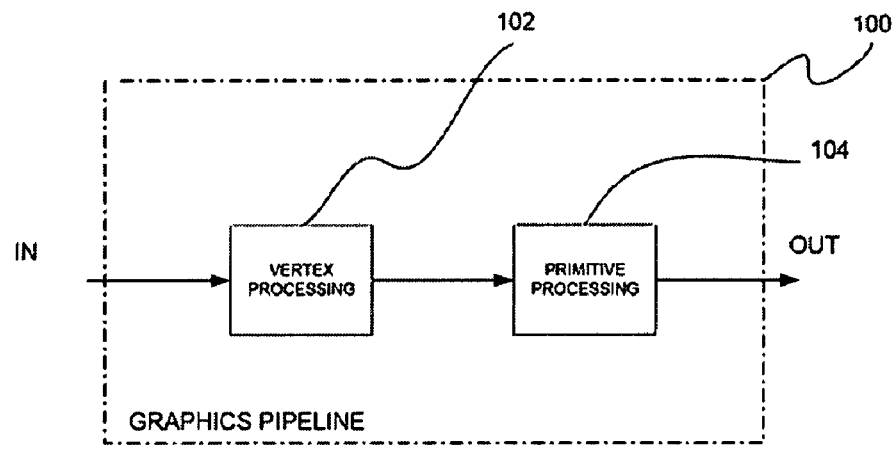
FIG. 1 is a conceptual diagram illustrating a graphics pipeline in accordance with one embodiment of the present invention.

FIG. 1 is a conceptual diagram illustrating a graphics pipeline 100 in accordance with one embodiment of the present invention. During use, the graphics pipeline 100 is adapted to carry out numerous operations for the purpose of processing computer graphics. Such operations may be categorized into two types, namely vertex processing 102 and primitive processing 104. At least partially during use, the vertex processing 102 and primitive processing 104 adhere to a standard graphics application program interface (API) such as OpenGL® or any other desired graphics API.

Vertex processing 102 normally leads primitive processing 104, and includes well known operations such as texgen operations, lighting operations, transform operations, and/or any other operations that involve vertices in the computer graphics pipeline 100.

Primitive processing 104 normally follows vertex processing 102, and includes well known operations such as culling, frustum clipping, polymode operations, flat shading, polygon offsetting, fragmenting, and/or any other operations that involve primitives in the computer graphics pipeline 100. It should be noted that still other operations may be performed such as viewport operations.

Figure 2:
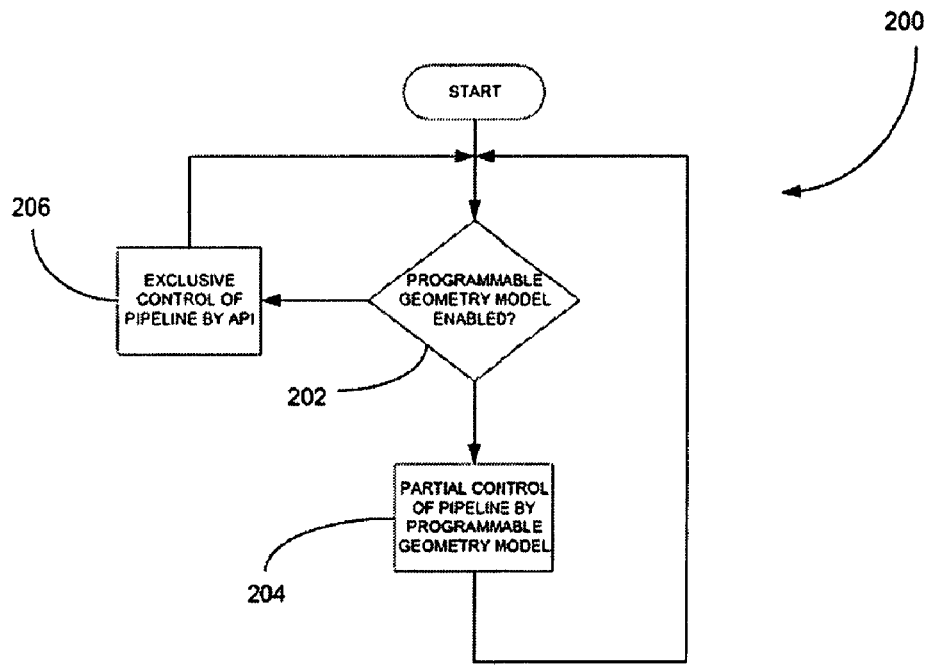
FIG. 2 illustrates the overall operation of the various components of the graphics pipeline of FIG. 1.

FIG. 2 illustrates a high level operation 200 of the graphics pipeline 100 of FIG. 1. As shown, it is constantly determined in decision 202 whether current operation invokes a programmable geometry model of the present invention. If so, a mode is enabled that partially supercedes the vertex processing 102 of the standard graphics API, thus providing increased flexibility in generating visual effects. See operation 204.

When disabled, the present invention allows increased or exclusive control of the graphics pipeline 100 by the standard graphics API, as indicated in operation 206. In one embodiment, states of the standard graphics API state may not be overruled by invoking the programmable geometry mode of the present invention. In one embodiment, no graphics API state may be directly accessible by the present invention.

In one embodiment of the present invention, the programmable geometry mode of the present invention may optionally be limited to vertex processing from object space into homogeneous clip space. This is to avoid compromising hardware performance that is afforded by allowing exclusive control of the primitive processing 104 by the standard graphics API at all times.

The remaining description will be set forth assuming that the programmable geometry mode supersedes the standard graphics API only during vertex processing 102. It should be noted, however, that in various embodiments of the present invention, the programmable geometry mode may also supersede the standard graphics API during primitive processing 104.

Figure 3:
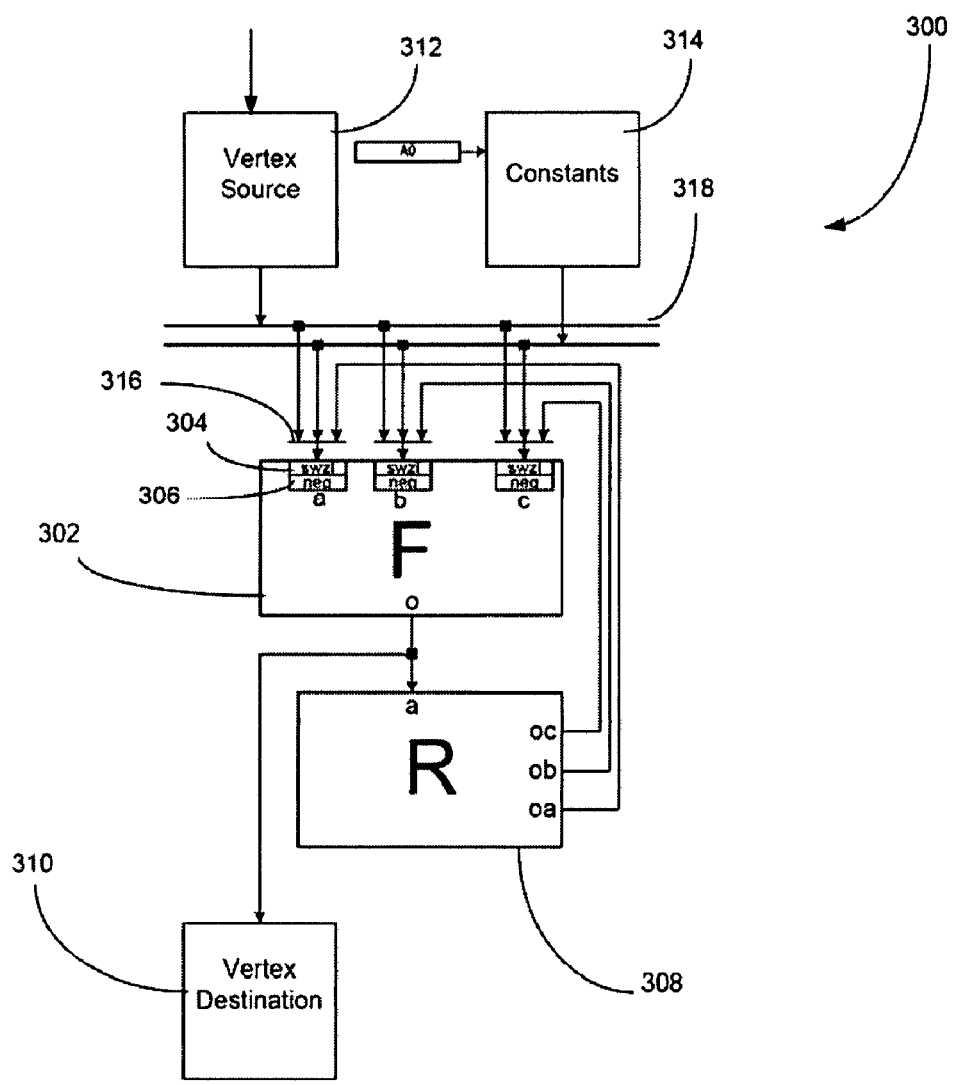
FIG. 3 is a schematic illustrating one embodiment of a programming model in accordance with the present invention.

FIG. 3 is a schematic illustrating one embodiment of a programming model 300 in accordance with the present invention. Such programming model 300 may be adapted to work with hardware accelerators of various configuration and/or with central processing unit (CPU) processing.

As shown in FIG. 3, the programming module 300 includes a functional module 302 that is capable of carrying out a plurality of different types of operations. The functional module 302 is equipped with three inputs and an output. Associated with each of the three inputs is a swizzling module 304 and a negating module 306 for purposes that will be set forth hereinafter in greater detail.

Coupled to the output of the functional module 302 is an input of a register 308 having three outputs. Also coupled to the output of the functional module 302 is a vertex destination buffer 310. The vertex destination buffer 310 may include a vector component write mask, and may preclude read access.

Also included are a vertex source buffer 312 and a constant source buffer 314. The vertex source buffer 312 stores data in the form of vertex data, and may be equipped with write access and/or at least single read access. The constant source buffer 314 stores data in the form of constant data, and may also be equipped with write access and/or at least single read access.

Each of the inputs of the functional module 302 is equipped with a multiplexer 316. This allows the outputs of the register 308, vertex source buffer 312, and constant source buffer 314 to be fed to the inputs of the functional module 302. This is facilitated by buses 318.

Figure 4:
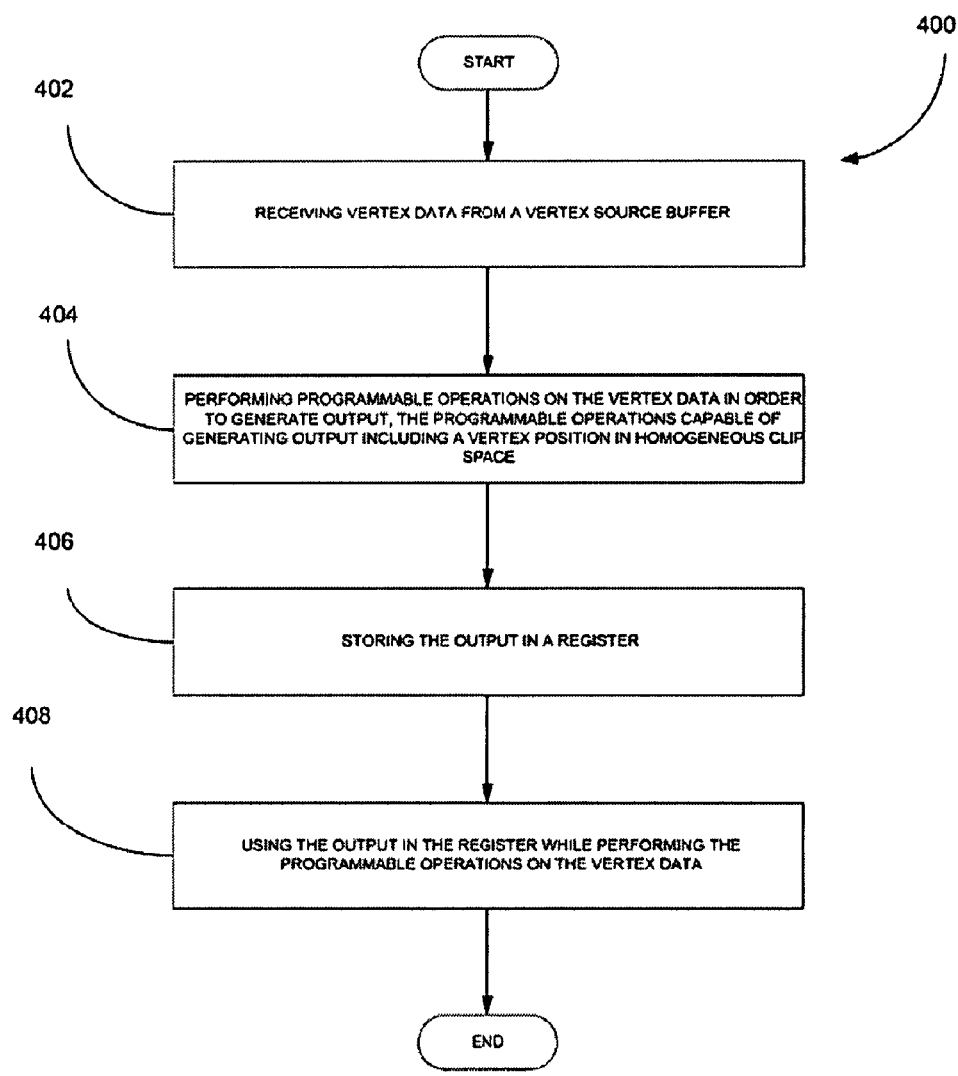
FIG. 4 is a flowchart illustrating the method by which the programming model of FIG. 3 carries out programmable vertex processing in the computer graphics pipeline.

FIG. 4 is a flowchart illustrating the method 400 by which the model of FIG. 3 carries out programmable vertex processing in the computer graphics pipeline 100. Initially, in operation 402, data is received from a vertex source buffer 312. Such data may include any type of information that is involved during the processing of vertices in the computer graphics pipeline 100. Further, the vertex source buffer 312 may include any type of memory capable of storing data.

Thereafter, in operation 404, programmable operations, i.e. vertex processing 102, are performed on the data in order to generate output. The programmable operations are capable of generating output including at the very least a position of a vertex in homogeneous clip space. In one embodiment, such position may be designated using Cartesian coordinates each with a normalized range between −1.0 and 1.0. Such output is stored in the register 308 in operation 406. During operation 408, the output stored in the register 308 is used in performing the programmable operations on the data. Thus, the register 308 may include any type of memory capable of allowing the execution of the programmable operations on the output.

By this design, the present invention allows a user to program a portion of the graphics pipeline 100 that handles vertex processing. This results in an increased flexibility in generating visual effects. Further, the programmable vertex processing of the present invention allows remaining portions of the graphics pipeline 100 to be controlled by the standard application program interface (API) for the purpose of preserving hardware optimizations.

During operation, only one vertex is processed at a time in the functional module 302 that performs the programmable operations. As such, the vertices may be processed independently. Further, the various foregoing operations may be processed for multiple vertices in parallel.

In one embodiment of the present invention, a constant may be received, and the programmable operations may be performed based on the constant. During operation, the constant may be stored in and received from the constant source buffer 314.

Further, the constant may be accessed in the constant source buffer 314 using an absolute or relative address. As an option, there may be one address register for use during reads from the constant source buffer 314. It may be initialized to 0 at the start of program execution in operation 204 of FIG. 2. Further, the constant source buffer 314 may be written with a program which may or may not be exposed to users.

The register 308 may be equipped with single write and triple read access. Register contents may be initialized to (0,0,0,0) at the start of program execution in operation 204 of FIG. 2. It should be understood that the output of the functional module 302 may also be stored in the vertex destination buffer 310. The vertex position output may be stored in the vertex destination buffer 310 under a predetermined reserved address. The contents of the vertex destination buffer 310 may be initialized to (0,0,0,1) at the start of program execution in operation 204 of FIG. 2.

As an option, the programmable vertex processing may include negating the data. Still yet, the programmable vertex processing may also involve swizzling the data. Data swizzling is useful when generating vectors. Such technique allows the efficient generation of a vector cross product and other vectors.

In one embodiment, the vertex source buffer 312 may be 16 quad-words in size (16*128 bits). Execution of the present invention may be commenced when Param[0]/Position is written. All attributes may be persistent. That is, they remain constant until changed. Table 1 illustrates the framework of the vertex source buffer 312. It should be noted that the number of textures supported may vary across implementations.

TABLE 1

| Program Mode | Standard API | |
| --- | --- | --- |
| Param[0] X, Y, Z, W | Position | X, Y, Z, W |
| Param[1] X, Y, Z, W | Skin Weights | W, W, W, W |
| Param[2] X, Y, Z, W | Normal | X, Y, Z, * |
| Param[3] X, Y, Z, W | Diffuse Color | R, G, B, A |
| Param[4] X, Y, Z, W | Specular Color | R, G, B, A |
| Param[5] X, Y, Z, W | Fog | F, *, *, * |
| Param[6] X, Y, Z, W | Point Size | P, *, *, * |
| Param[7] X, Y, Z, W | | *, *, *, * |
| Param[8] X, Y, Z, W | | *, *, *, * |
| Param[9] X, Y, Z, W | Texture0 | S, T, R, Q |
| Param[10] X, Y, Z, W | Texture1 | S, T, R, Q |
| Param[11] X, Y, Z, W | Texture2 | S, T, R, Q |
| Param[12] X, Y, Z, W | Texture3 | S, T, R, Q |

TABLE 1-continued

| Program Mode | Standard API | |
| --- | --- | --- |
| Param[13] X, Y, Z, W | Texture4 | S, T, R, Q |
| Param[14] X, Y, Z, W | Texture5 | S, T, R, Q |
| Param[15] X, Y, Z, W | Texture6 | S, T, R, Q |

In another embodiment, the vertex destination buffer 310 may be 13 quad-words in size and may be deemed complete when the program is finished. The following exemplary vertex destination buffer addresses are pre-defined to fit a standard pipeline. Contents are initialized to (0,0,0,1) at start of program execution in operation 204 of FIG. 2. Writes to locations that are not used by the downstream hardware may be ignored.

A reserved address (HPOS) may be used to denote the homogeneous clip space position of the vertex in the vertex destination buffer 310. It may be generated by the geometry program. Table 2 illustrates the various locations of the vertex destination buffer 310 and a description thereof.

TABLE 2

| Location | Description | | |
| --- | --- | --- | --- |
| HPOS | HClip Position | x, y, z, w | (−1.0 to 1.0) |
| COL0 | Color0 (diff) | r, g, b, a | (0.0 to 1.0) |
| COL1 | Color1 (spec) | r, g, b, a | (0.0 to 1.0) |
| BCOL0 | Color0 (diff) | r, g, b, a | (0.0 to 1.0) |
| BCOL1 | Color1 (spec) | r, g, b, a | (0.0 to 1.0) |
| FOGP | Fog Parameter | f, *, *, * | |
| PSIZ | Point Size | p, *, *, * | |
| TEX0 | Texture0 | s, t, r, q | |
| TEX1 | Texture1 | s, t, r, q | |
| TEX2 | Texture2 | s, t, r, q | |
| TEX3 | Texture3 | s, t, r, q | |

| | |
| --- | --- |
| HPOS | homogeneous clip space position float[4] x, y, z, w standard graphics pipeline process further (clip check, perspective divide, viewport scale and bias). |
| COL0/BCOL0 | color0 (diffuse) |
| COL1/BCOL1 | color1 (specular) float[4] r, g, b, a each component gets clamped to (0.0, 1.0) before interpolation each component is interpolated at least as 8-bit unsigned integer. |
| TEX0-7 | textures 0 to 7 float[4] s, t, r, q each component is interpolated as high precision float, followed by division of q and texture lookup. Extra colors could use texture slots. Advanced fog can be done as a texture. |
| FOGP | fog parameter float[1] f (distance used in fog equation) gets interpolated as a medium precision float and used in a fog evaluation (linear, exp, exp2) generating a fog color blend value. |
| PSIZ | point size float[1] p gets clamped to (0.0, POINT_SIZE_MAX) and used as point size. |

An exemplary assembly language that may be used in one implementation of the present invention will now be set forth. In one embodiment, no branching instructions may be allowed for maintaining simplicity. It should be noted, however, that branching may be simulated using various combinations of operations, as is well known to those of ordinary skill. Table 3 illustrates a list of the various resources associated with the programming model 300 of FIG. 3. Also shown in a reference format associated with each of the resources along with a proposed size thereof.

TABLE 3

| Resources: | |
| --- | --- |
| Vertex Source - v[*] | of size 16 vectors (256B) |
| Constant Memory - c[*] | of size 192 vectors (1536B) |
| Address Register - A0.x | of size 1 signed integer (or multiple vectors) |
| Data Registers - R0-R11, R12 | of size 13 vectors (192B) |
| Vertex Destination - o[*] | of size 11 vectors (208B) |
| Instruction Storage | of size 128 instructions |

Note:
All data registers and memory locations may be four component floats.

For example, the constant source buffer 314 may be accessed as c[*] (absolute) or as c[A0.x+*] (relative). In the relative case, a 32-bit signed address register may be added to the read address. Out of range address reads may result in (0,0,0,0). In one embodiment, the vertex source buffer 312, vertex destination buffer 310, and register 308 may not use relative addressing.

Vector components may be swizzled before use via four subscripts (xyzw). Accordingly, an arbitrary component re-mapping may be done. Examples of swizzling commands are shown in Table 4.

TABLE 4

| .xyzw means source(x, y, z, w) → input(x, y, z, w) |
| --- |
| .zzxy means source(x, y, z, w) → input(z, z, x, y) |
| .xxxx means source(x, y, z, w) → input(x, x, x, x) |

Table 5 illustrates an optional shortcut notation of the assembly language that may be permitted.

TABLE 5

| No subscripts is the same as .xyzw |
| --- |
| .x is the same as .xxxx |
| .y is the same as .yyyy |
| .z is the same as .zzzz |
| .w is the same as .wwww |

All source operands may be negated by putting a '–' sign in front of the above notation. Writes to the register 308 may be maskable. In other words, each component may be written only if it appears as a destination subscript (from xyzw). No swizzling may be possible for writes, and subscripts may be ordered (x before y before z before w).

Writes to the vertex destination buffer 310 and/or the constant memory 314 may also be maskable. Each component may be written only if it appears as a destination subscript (from xyzw). No swizzling may be permitted for writes, and subscripts may be ordered (x before y before z before w).

An exemplary assembler format is as follows:
OPCODE DESTINATION, SOURCE(S)

Generated data may be written to the register 308 or the vertex destination buffer 310. Output data is taken from the functional module 302. Table 6 illustrates commands in the proposed assembler format which write output to the register 308 or the vertex destination buffer 310.

TABLE 6

| ADD R4, R1, R2 | result goes into R4 |
| --- | --- |
| ADD o[HPOS], R1, R2 | result goes into the destination buffer |
| ADD R4.xy, R1, R2 | result goes into x, y components of R4 |

During operation, the programmable vertex processing is adapted for carrying out various instructions of an instruction set using any type of programming language including, but not limited to that set forth hereinabove. Such instructions may include, but are not limited to a no operation, address register load, move, multiply, addition, multiply and addition, reciprocal, reciprocal square root, three component dot product, four component dot product, distance vector, minimum, maximum, set on less than, set on greater or equal than, exponential base two (2), logarithm base two (2), and/or light coefficients. Table 7 illustrates the operation code associated with each of the foregoing instructions. Also indicated is a number of inputs and outputs as well as whether the inputs and outputs are scalar or vector.

TABLE 7

| OPCODE | INPUT(scalar or vector) | OUTPUT(replicated scalar or vector) |
| --- | --- | --- |
| NOP | | |
| ARL | s | |
| MOV | v | v |
| MUL | v, v | v |
| ADD | v, v | v |
| MAD | v, v, v | v |
| RCP | s | s, s, s, s or v or v or v |
| RSQ | s | s, s, s, s or v |
| DP3 | v, v | s, s, s, s |
| DP4 | v, v | s, s, s, s |
| DST | v, v | V |
| MIN | v, v | V |
| MAX | v, v | V |
| SLT | v, v | V |
| SGE | v, v | V |
| EXP | s | V |
| LOG | s | v |
| LIT | v | v |

As shown in Table 7, each of the instructions includes an input and an output which may take the form of a vector and/or a scalar. It should be noted that such vector and scalar inputs and outputs may be handled in various ways. Further information on dealing with such inputs and outputs may be had by reference to a co-pending application entitled "METHOD, APPARATUS AND ARTICLE OF MANUFACTURE FOR A TRANSFORM MODULE IN A GRAPHICS PROCESSOR" filed Dec. 6, 1999 under Ser. No. 09/456,102 which is incorporated herein by reference in its entirety.

These various instructions may each be carried out using a unique associated method and data structure. Such data structure includes a source location identifier indicating a source location of data to be processed. Such source location may include a plurality of components. Further provided is a source component identifier indicating in which of the plurality of components of the source location the data resides. The data may be retrieved based on the source location identifier and the source component identifier. This way, the operation associated with the instruction at hand may be performed on the retrieved data in order to generate output.

Also provided is a destination location identifier for indicating a destination location of the output. Such destination location may include a plurality of components. Further, a destination component identifier is included indicating in which of the plurality of components of the destination location the output is to be stored. In operation, the output is stored based on the destination location identifier and the destination component identifier.

Figure 5:
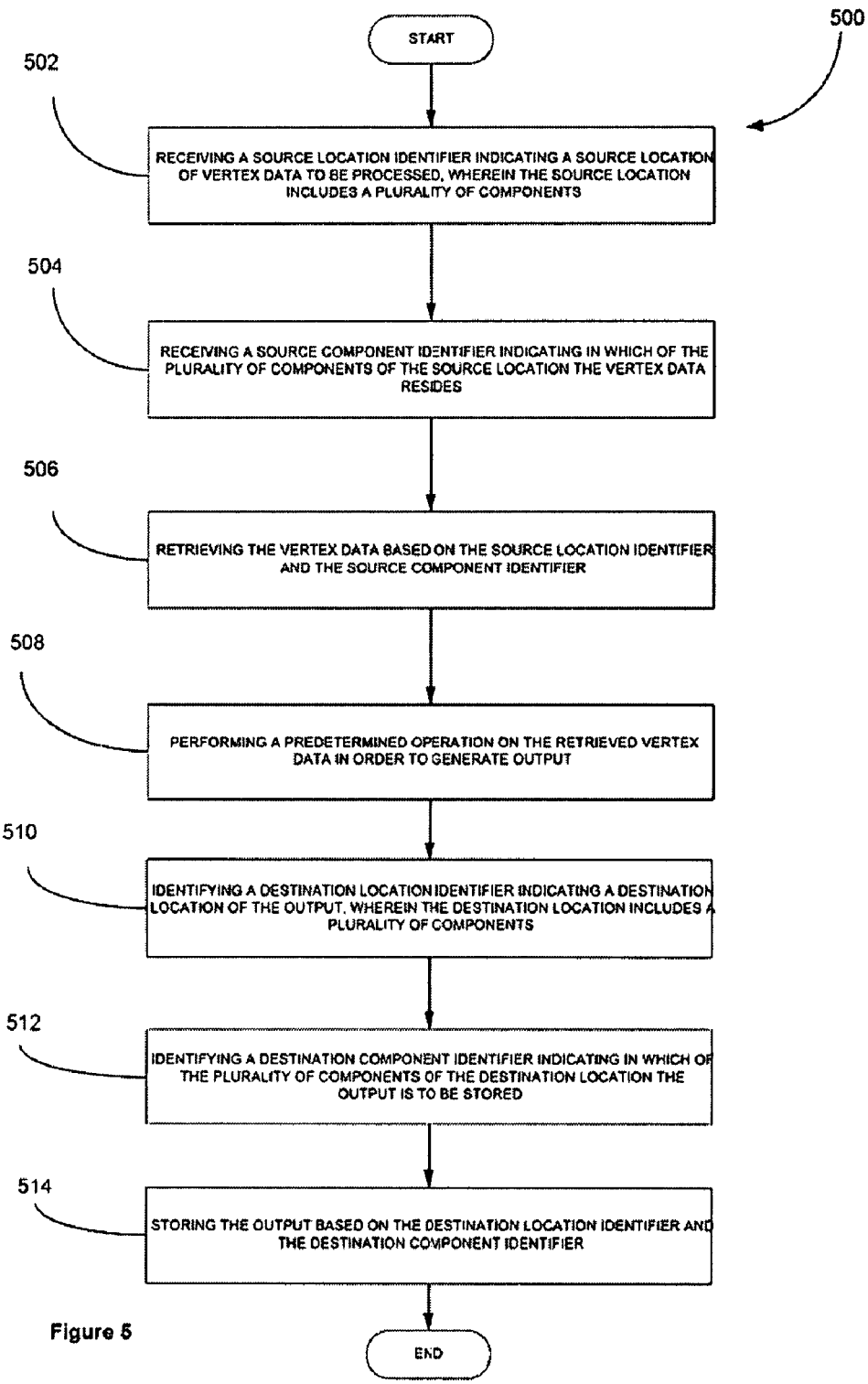
FIG. 5 is a flowchart illustrating the method in a data structure is employed to carry out graphics instructions in accordance with one embodiment of the present invention.

FIG. 5 is a flowchart illustrating the method 500 in which the foregoing data structure is employed in carrying out the instructions in accordance with one embodiment of the present invention. First, in operation 502, the source location identifier is received indicating a source location of data to be processed. Thereafter, in operation 504, the source component identifier is received indicating in which of the plurality of components of the source location the data resides.

The data is subsequently retrieved based on the source location identifier and the source component identifier, as indicated in operation 506. Further, the particular operation is performed on the retrieved data in order to generate output. See operation 508. The destination location identifier is then identified in operation 510 for indicating a destination location of the output. In operation 512, the destination component identifier is identified for indicating in which of the plurality of components of the destination location the output is to be stored. Finally, in operation 514, the output is stored based on the destination location identifier and the destination component identifier.

Further information will now be set forth regarding each of the instructions set forth in Table 7. In particular, an exemplary format, description, operation, and examples are provided using the programming language set forth earlier.

Address Register Load (ARL)

Format:
   ARL A0.x,[−]S0.[xyzw]

Description:

The contents of source scalar are moved into a specified address register. Source may have one subscript. Destination may have an ".x" subscript. In one embodiment, the only valid address register may be designated as "A0.x." The address register "A0.x" may be used as a base address for constant reads. The source may be a float that is truncated towards negative infinity into a signed integer.

Operation:

Table 8A sets forth an example of operation associated with the ARL instruction.

TABLE 8A

```
t.x = source0.c***;        /* c is x or y or z or w */
t.y = source0.*c**;
t.z = source0.**c*;
t.w = source0.***c;
if (−source0)
    t = −t;
A0.x = TruncateTo-Infinity(t.x);
```

Examples:
   ARL A0.x,v[7].w (move vertex scalar into address register 0)
   MOV R6,c[A0.x+7] (move constant at address A0.x+7 into register R6)

Mov (MOV)

Format:
   MOV D[.xyzw],[−]S0[.xyzw]

Description:

The contents of a designated source are moved into a destination.

Operation:

Table 8B sets forth an example of operation associated with the MOV instruction.

TABLE 8B

```
t.x = source0.c***;
t.y = source0.*c**;
t.z = source0.**c*;
t.w = source0.***c;
if (negate0) {
    t.x = −t.x;
    t.y = −t.y;
    t.z = −t.z;
    t.w = −t.w;
}
if (xmask) destination.x = t.x;
if (ymask) destination.y = t.y;
if (zmask) destination.z = t.z;
if (wmask) destination.w = t.w;
```

Examples:
   MOV o[1],−R4 (move negative R4 into o[1])
   MOV R5,v[POS].w (move w component of v[POS] into xyzw components of R5)
   MOV o[HPOS],c[0] (output constant in location zero)
   MOV R7.xyw,R4.x (move x component of R4 into x,y,w components of R7)

Multiply (MUL)

Format:
   MUL D[.xyzw],[−]S0[.xyzw],[−]S1[xyzw]

Description:
   The present instruction multiplies sources into a destination. It should be noted that 0.0 times anything is 0.0.

Operation:
   Table 8C sets forth an example of operation associated with the MUL instruction.

TABLE 8C

```
t.x = source0.c***;
t.y = source0.*c**;
t.z = source0.**c*;
t.w = source0.***c;
if (negate0) {
    t.x = −t.x;
    t.y = −t.y;
    t.z = −t.z;
    t.w = −t.w;
}
u.x = source1.c***;
u.y = source1.*c**;
u.z = source1.**c*;
u.w = source1.***c;
if (negate1) {
    u.x = −u.x;
    u.y = −u.y;
    u.z = −u.z;
    u.w = −u.w;
}
if (xmask) destination.x = t.x * u.x;
if (ymask) destination.y = t.y * u.y;
if (zmask) destination.z = t.z * u.z;
if (wmask) destination.w = t.w * u.w;
```

Examples:
   MUL R6,R5,c[CON5]   R6.xyzw=R5.xyzw*c[CON5].xyzw
   MUL R6.x,R5.w,−R7 R6.x=R5.w*−R7.x Add (ADD)

Format:
   ADD D[xyzw],[−]S0[.xyzw],[−]S1[.xyzw]

Description:
The present instruction adds sources into a destination.

Operation:
Table 8D sets forth an example of operation associated with the ADD instruction.

TABLE 8D

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
if (xmask) destination.x = t.x + u.x;
if (ymask) destination.y = t.y + u.y;
if (zmask) destination.z = t.z + u.z;
if (wmask) destination.w = t.w + u.w;
```

Examples:
ADD R6,R5.x,c[CON5] R6.xyzw=R5.x+c[CON5].xyzw
ADD R6.x,R5,-R7 R6.x=R5.x-R7.x
ADD R6,-R5,c[CON5] R6.xyzw=-R5.xyzw+c[CON5].xyzw Multiply And Add (MAD)

Format:
MAD D[.xyzw],[-]S0[.xyzw],[-]S1[.xyzw],[-]S2[.xyzw]

Description:
The present instruction multiplies and adds sources into a destination. It should be noted that 0.0 times anything is 0.0.

Operation:
Table 8E sets forth an example of operation associated with the MAD instruction.

TABLE 8E

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
v.x = source2.c***;
```

TABLE 8E-continued

```
v.y = source2.*c**;
v.z = source2.**c*;
v.w = source2.***c;
if (negate2) {
    v.x = -v.x;
    v.y = -v.y;
    v.z = -v.z;
    v.w = -v.w;
}
if (xmask) destination.x = t.x * u.x + v.x;
if (ymask) destination.y = t.y * u.y + v.y;
if (zmask) destination.z = t.z * u.z + v.z;
if (wmask) destination.w = t.w * u.w + v.w;
```

Examples:
MAD R6,-R5,v[POS],-R3 R6=-R5*v[POS]-R3
MAD R6.z,R5.w,v[POS],R5 R6.z=R5.w*v[POS].z+R5.z Reciprocal (RCP)

Format:
RCP D[.xyzw],[-]S0.[xyzw]

Description:
The present instruction inverts a source scalar into a destination. The source may have one subscript. Output may be exactly 1.0 if the input is exactly 1.0.
RCP(-Inf) gives (-0.0,-0.0,-0.0,-0.0)
RCP(-0.0) gives (-Inf,-Inf,-Inf,-Inf)
RCP(+0.0) gives (+Inf,+Inf,+Inf,+Inf)
RCP(+Inf) gives (0.0,0.0,0.0,0.0)

Operation:
Table 8F sets forth an example of operation associated with the RCP instruction.

TABLE 8F

```
t.x = source0.c;
if (negate0) {
    t.x = -t.x;
}
if (t.x == 1.0f) {
    u.x = 1.0f;
} else {
    u.x = 1.0f / t.x;
}
if (xmask) destination.x = u.x;
if (ymask) destination.y = u.x;
if (zmask) destination.z = u.x;
if (wmask) destination.w = u.x;
where
    | u.x - IEEE(1.0f/t.x) | < 1.0f/(2^22)
for 1.0f <= t.x <= 2.0f. The intent of this precision requirement is
    that this amount of relative precision apply over all values of t.x.
``` for $1.0f <= t.x <= 2.0f$. The intent of this precision requirement is
that this amount of relative precision apply over all values of t.x.

Examples:
RCP R2,c[A0.x+14].x R2.xyzw=1/c[A0.x+14].x
RCP R2.w,R3.z R2.w=1/R3.z

Reciprocal Square Root (RSQ)

Format:
RSQ D[.xyzw],[-]S0.[xyzw]

Description:

The present instruction performs an inverse square root of absolute value on a source scalar into a destination. The source may have one subscript. The output may be exactly 1.0 if the input is exactly 1.0.

RSQ(0.0) gives (+Inf,+Inf,+Inf,+Inf)
RSQ(Inf) gives (0.0,0.0,0.0,0.0)

Operation:

Table 8G sets forth an example of operation associated with the RSQ instruction.

TABLE 8G

```
t.x = source0.c;
if (negate0) {
    t.x = -t.x;
}
if (fabs(t.x) == 1.0f) {
    u.x = 1.0f;
} else {
    u.x = 1.0f / sqrt(fabs(t.x));
}
if (xmask) destination.x = u.x;
if (ymask) destination.y = u.x;
if (zmask) destination.z = u.x;
if (wmask) destination.w = u.x;
where
    | u.x –IEEE(1.0f/sqrt(fabs(t.x))) | < 1.0f/(2^22)
    for 1.0f <= t.x <= 4.0f. The intent of this precision
requirement is
    that this amount of relative precision apply over all values of
t.x
``` where

|u.x–IEEE(1.0f/sqrt(fabs(t.x)))|<1.0f/(2^22)

for 1.0f<=t.x<=4.0f. The intent of this precision requirement is that this amount of relative precision apply over all values of t.x.

Examples:

RSQ o[PA0],R3.y o[PA0]=1/sqrt(abs(R3.y))
RSQ R2.w,v[9].x R2.w=1/sqrt(abs(v[9].x))

Three Component Dot Product (DP3)

Format:

DP3 D[xyzw],[–]S0[.xyzw],[–]S1[.xyzw]

Description:

The present instruction performs a three component dot product of the sources into a destination. It should be noted that 0.0 times anything is 0.0.

Operation:

Table 8H sets forth an example of operation associated with the DP3 instruction.

TABLE 8H

```
t.x = source0.c***;
t.y = source0.*c**;
t.z = source0.**c*;
if (negate0) {
    t.x = -t.x;
    t.y = -t.y;
    t.z = -t.z;
}
u.x = source1.c***;
u.y = source1.*c**;
u.z = source1.**c*;
if (negate1) {
    u.x = -u.x;
    u.y = -u.y;
```

TABLE 8H-continued

```
    u.z = -u.z;
}
v.x = t.x * u.x + t.y * u.y + t.z * u.z;
if (xmask) destination.x = v.x;
if (ymask) destination.y = v.x;
if (zmask) destination.z = v.x;
if (wmask) destination.w = v.x;
```

Examples:

DP3 R6,R3,R4 R6.xyzw=R3.x*R4.x+R3.y*R4.y+R3.z*R4.z
DP3 R6.w,R3,R4 R6.w=R3.x*R4.x+R3.y*R4.y+R3.z*R4.z Four Component Dot Product (DP4)

Format:

DP4 D[xyzw],[–]S0[.xyzw],[–]S1[.xyzw]

Description:

The present instruction performs a four component dot product of the sources into a destination. It should be noted that 0.0 times anything is 0.0.

Operation:

Table 8I sets forth an example of operation associated with the DP4 instruction.

TABLE 8I

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
v.x = t.x * u.x + t.y * u.y + t.z * u.z + t.w * u.w;
if (xmask) destination.x = v.x;
if (ymask) destination.y = v.x;
if (zmask) destination.z = v.x;
if (wmask) destination.w = v.x;
```

Examples:

DP4 R6,v[POS],c[MV0] R6.xyzw=v.x*c.x+v.y*c.y+v.z*c.z+v.w*c.w
DP4 R6.xw,v[POS].w,R3 R6.xw=v.w*R3.x+v.w*R3.y+v.w*R3.z+v.w*R3.w Distance Vector (DST)

Format:

DST D[.xyzw],[–]S0[.xyzw],[–]S1[.xyzw]

Description:

The present instruction calculates a distance vector. A first source vector is assumed to be (NA,d*d,d*d,NA) and a second source vector is assumed to be (NA,1/d,NA,1/d). A destination vector is then outputted in the form of (1,d,d*d,1/d). It should be noted that 0.0 times anything is 0.0.

Operation:

Table 8J sets forth an example of operation associated with the DST instruction.

TABLE 8J

```
t.y = source0.*c**;
t.z = source0.**c*;
if (negate0) {
    t.y = -t.y;
    t.z = -t.z;
}
u.y = source1.*c**;
u.w = source1.***c;
if (negate1) {
    u.y = -u.y;
    u.w = -u.w;
}
if (xmask) destination.x = 1.0;
if (ymask) destination.y = t.y*u.y;
if (zmask) destination.z = t.z;
if (wmask) destination.w = u.w;
```

Examples:
  DST R2,R3,R4 R2.xyzw=(1.0,R3.y*R4.y,R3.z,R4.w)

Minimum (MIN)

Format:
  MIN D[.xyzw],[-]S0[.xyzw],[-]S1[.xyzw]

Description:
  The present instruction determines a minimum of sources, and moves the same into a destination.

Operation:
  Table 8K sets forth an example of operation associated with the MIN instruction.

TABLE 8K

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
if (xmask) destination.x = (t.x < u.x) ? t.x : u.x;
if (ymask) destination.y = (t.y < u.y) ? t.y : u.y;
if (zmask) destination.z = (t.z < u.z) ? t.z : u.z;
if (wmask) destination.w = (t.w < u.w) ? t.w : u.w;
``` if (wmask) destination.w=(t.w<u.w) ? t.w:u.w;

Examples:

MIN R2,R3,R4 R2=component min(R3,R4)

MIN R2.x,R3.z,R4 R2.x=min(R3.z,R4.x)

Maximum (MAX)

Format:
  MAX D[.xyzw],[-]S0[.xyzw],[-]S1[.xyzw]

Description:
  The present instruction determines a maximum of sources, and moves the same into a destination.

Operation:
  Table 8L sets forth an example of operation associated with the MAX instruction.

TABLE 8L

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
if (negate1) {
    u.x = -u.x;
    u.y = -u.y;
    u.z = -u.z;
    u.w = -u.w;
}
if (xmask) destination.x = (t.x >= u.x) ? tx : u.x;
if (ymask) destination.y = (t.y >= u.y) ? t.y : u.y;
if (zmask) destination.z = (t.z >= u.z) ? t.z : u.z;
if (wmask) destination.w = (t.w >= u.w) ? t.w : u.w;
```

Examples:
  MAX R2,R3,R4 R2=component max(R3,R4)
  MAX R2.w,R3.x,R4 R2.w=max(R3.x,R4.w)

Set On Less Than (SLT)

Format:
  SLT D[.xyzw],[-]S0[.xyzw],[-]S1[.xyzw]

Description:
  The present instruction sets a destination to 1.0/0.0 if source0 is less_than/greater_or_equal to source1. The following relationships should be noted:
  SetEQ R0,R1=(SGE R0,R1)*(SGE -R0,-R1)
  SetNE R0,R1=(SLT R0,R1)+(SLT -R0,-R1)
  SetLE R0,R1=SGE -R0,-R1
  SetGT R0,R1=SLT -R0,-R1

Operation:
  Table 8M sets forth an example of operation associated with the SLT instruction.

TABLE 8M

```
t.x = source0.c***;
t.y = source0.*c**;
t.z = source0.**c*;
t.w = source0.***c;
if (negate0) {
    t.x = -t.x;
    t.y = -t.y;
    t.z = -t.z;
    t.w = -t.w;
}
u.x = source1.c***;
u.y = source1.*c**;
u.z = source1.**c*;
u.w = source1.***c;
```

TABLE 8M-continued

```
    if (negate1) {
        u.x = -u.x;
        u.y = -u.y;
        u.z = -u.z;
        u.w = -u.w;
    }
    if (xmask) destination.x = (t.x < u.x) ? 1.0 : 0.0;
    if (ymask) destination.y = (t.y < u.y) ? 1.0 : 0.0;
    if (zmask) destination.z = (t.z < u.z) ? 1.0 : 0.0;
    if (wmask) destination.w = (t.w < u.w) ? 1.0 : 0.0;
```

Examples:
SLT R4,R3,R7 R4.xyzw=(R3.xyzw<R7.xyzw ? 1.0:0.0)
SLT R3.xz,R6.w,R4 R3.xz=(R6.w<R4.xyzw ? 1.0:0.0)

Set On Greater Or Equal Than (SGE)

Format:
SGE D[.xyzw],[−]S0[.xyzw],[−]S1[.xyzw]

Description:
The present instruction set a destination to 1.0/0.0 if source0 is greater_or_equal/less_than source1.

Operation:
Table 8N sets forth an example of operation associated with the SGE instruction.

TABLE 8N

```
    t.x = source0.c***;
    t.y = source0.*c**;
    t.z = source0.**c*;
    t.w = source0.***c;
    if (negate0) {
        t.x = -t.x;
        t.y = -t.y;
        t.z = -t.z;
        t.w = -t.w;
    }
    u.x = source1.c***;
    u.y = source1.*c**;
    u.z = source1.**c*;
    u.w = source1***c;
    if (negate1) {
        u.x = -u.x;
        u.y = -u.y;
        u.z = -u.z;
        u.w = -u.w;
    }
    if (xmask) destination.x = (t.x >= u.x) ? 1.0 : 0.0;
    if (ymask) destination.y = (t.y >= u.y) ? 1.0 : 0.0;
    if (zmask) destination.z = (t.z >= u.z) ? 1.0 : 0.0;
    if (wmask) destination.w = (t.w >= u.w) ? 1.0 : 0.0;
```

Examples:
SGE R4,R3,R7 R4.xyzw=(R3.xyzw >=R7.xyzw ? 1.0:0.0)
SGE R3.xz,R6.w,R4 R3.xz=(R6.w>=R4.xyzw ? 1.0:0.0)

Exponential Base 2 (EXP)

Format:
EXP D[.xyzw],[−]S0.[xyzw]

Description:
The present instruction performs an exponential base 2 partial support. It generates an approximate answer in dest.z, and allows for a more accurate answer of dest.x*FUNC(dest.y) where FUNC is some user approximation to 2**dest.y (0.0<=dest.y<1.0). It also accepts a scalar source0. It should be noted that reduced precision arithmetic is acceptable in evaluating dest.z.

EXP(−Inf) or underflow gives (0.0,0.0,0.0,1.0)
EXP(+Inf) or overflow gives (+Inf,0.0+Inf,1.0)

Operation:
Table 8O sets forth an example of operation associated with the EXP instruction.

TABLE 8O

```
    t.x = source0.c;
    if (negate0) {
        t.x = -t.x;
    }
    q.x = 2^floor(t.x);
    q.y = t.x − floor(t.x);
    q.z = q.x * APPX(q.y);
    if (xmask) destination.x = q.x;
    if (ymask) destination.y = q.y;
    if (zmask) destination.z = q.z;
    if (wmask) destination.w = 1.0;
    where APPX is an implementation dependent approximation of
exponential
    base 2 such that
        | exp(q.y*log(2.0)) −APPX(q.y) | < 1/(2^11)
    for all 0 >= q.y < 1.0.
    The expression "2^floor(t.x)" should overflow to +Inf and
underflow
    to zero.
``` where APPX is an implementation dependent approximation of exponential base 2 such that
|exp(q.y*log(2.0))−APPX(q.y)|<1/(2^11)
for all 0<=q.y<1.0.
The expression "2^floor(t.x)" should overflow to +Inf and underflow to zero.

Examples:
EXP R4,R3.z

Logarithm Base 2 (LOG)
Format:
LOG D[.xyzw],[−]S0.[xyzw]

Description:
The present instruction performs a logarithm base 2 partial support. It generates an approximate answer in dest.z and allows for a more accurate answer of dest.x+FUNC(dest.y) where FUNC is some user approximation of log 2(dest.y) (1.0<=dest.y<2.0). It also accepts a scalar source0 of which the sign bit is ignored. Reduced precision arithmetic is acceptable in evaluating dest.z.
LOG(0.0) gives (−Inf,1.0,−Inf,1.0)
LOG(Inf) gives (Inf,1.0,Inf,1.0)

Operation:
Table 8P sets forth an example of operation associated with the LOG instruction.

TABLE 8P

```
    t.x = source0.c;
    if (negate0) {
        t.x = t.x;
    }
    if (fabs(t.x) != 0.0f) {
        if (fabs(t.x) == +Inf) {
            q.x = +Inf;
            q.y = 1.0;
            q.z = +Inf;
        } else {
            q.x = Exponent(t.x);
            q.y = Mantissa(t.x);
            q.z = q.x + APPX(q.y);
        }
    } else {
```

TABLE 8P-continued

```
    q.x = -Inf;
    q.y = 1.0;
    q.z = -Inf;
if (xmask) destination.x = q.x;
if (ymask) destination.y = q.y;
if (zmask) destination.z = q.z;
if (wmask) destination.w = 1.0;
where APPX is an implementation dependent approximation of
logarithm
    base such that
        | log(q.y)/log(2.0) – APPX(q.y) | < 1/(2^11)
    for all 1.0 <= q.y < 2.0.
``` where APPX is an implementation dependent approximation of logarithm base 2 such that $|\log(q.y)/\log(2.0) - APPX(q.y)| < 1/(2^{11})$ for all $1.0 <= q.y < 2.0$.

Examples:

LOG R4,R3.z

Light Coefficients (LIT)

Format:

LIT D[xyzw],[-]S0[.xyzw]

Description:

The present instruction provides lighting partial support. It calculates lighting coefficients from two dot products and a power (which gets clamped to -128.0<power<128.0). The source vector is:

Source0.x=n*l(unit normal and light vectors)

Source0.y=n*h (unit normal and halfangle vectors)

Source0.z is unused

Source0.w=power

Reduced precision arithmetic is acceptable in evaluating dest.z. Allowed error is equivalent to a power function combining the LOG and EXP instructions (EXP(w*LOG(y))). An implementation may support at least 8 fraction bits in the power. Note that since 0.0 times anything may be 0.0, taking any base to the power of 0.0 will yield 1.0.

Operation:

Table 8Q sets forth an example of operation associated with the LIT instruction.

TABLE 8Q

```
t.x = source0.c***;
t.y = source0.*c**;
t.w = source0.***c;
if (negate0)
    t.x = -t.x;
    t.y = -t.y;
    t.w = -t.w;
}
if (t.w < -(128.0-epsilon)) t.w = -(128.0-epsilon);
else if (t.w > 128-epsilon) t.w = 128-epsilon;
if (t.x < 0.0) t.x = 0.0;
if (t.y < 0.0) t.y = 0.0;
if (xmask) destination.x = 1.0;
if (ymask) destination.y = t.x;
if (zmask) destination.z = (t.x > 0.0) ? EXP(t.w*LOG(t.y))
    : 0.0;
if (wmask) destination.w = 1.0;
```

Examples:

LIT R4,R3

Floating Point Requirements

In one embodiment, all vertex program calculations may be assumed to use IEEE single precision floating-point math with a format of sle8m23 (one signed bit, 8 bits of exponent, 23 bits of magnitude) or better and the round-to-zero rounding mode. Possible exceptions to this are the RCP, RSQ, LOG, EXP, and LIT instructions.

It should be noted that (positive or negative) 0.0 times anything is (positive) 0.0. The RCP and RSQ instructions deliver results accurate to $1.0/(2^{22})$ and the approximate output (the z component) of the EXP and LOG instructions only has to be accurate to $1.0/(2^{11})$. The LIT instruction specular output (the z component) is allowed an error equivalent to the combination of the EXP and LOG combination to implement a power function.

The floor operations used by the ARL and EXP instructions may operate identically. Specifically, the x component result of the EXP instruction exactly matches the integer stored in the address register by the ARL instruction.

Since distance is calculated as $(d^2)*(1/sqrt(d^2))$, 0.0 multiplied by anything is 0.0. This affects the MUL, MAD, DP3, DP4, DST, and LIT instructions. Because if/then/else conditional evaluation is done by multiplying by 1.0 or 0.0 and adding, the floating point computations may require:

0.0*x=0.0 for all x (including +Inf, -Inf, +NaN, and -Nan)

1.0*x=x for all x (including +Inf and -Inf)

0.0+x=x for all x (including +Inf and -Inf)

Including +Inf, -Inf, +Nan, and -Nan when applying the above three rules is recommended but not required. (The recommended inclusion of +Inf, -Inf, +Nan, and -Nan when applying the first rule is inconsistent with IEEE floating-point requirements.)

No floating-point exceptions or interrupts are necessarily generated. Denorms may not necessarily be supported. If a denorm is input, it is treated as 0.0 (ie, denorms are flushed to zero).

Computations involving +Nan or -Nan generate +NaN, except for the recommendation that zero times +Nan or -Nan may always be zero. (This exception is inconsistent with IEEE floating-point requirements).

PROGRAMMING EXAMPLES

A plurality of program examples will now be set forth in Table 9.

Table 9

The #define statements are meant for a cpp run.

Example 1

% !VS1.0

; Absolute Value R4=abs(R0)

MAX R4,R0,-R0;

Example 2

% !VS1.0

; Cross Product |i j k| into R2

; |R0.x R0.y R0.z|

; |R1.x R1.y R1.z|

MUL R2,R0.zxyw,R1.yzxw;

MAD R2,R0.yzxw,R1.zxyw,-R2;

Example 3

```
% !VS1.0
; Determinant |R0.x R0.y R0.z| into R3
; |R1.x R1.y R1.z|
; |R2.x R2.y R2.z|
MUL R3,R1.zxyw,R2.yzxw;
MAD R3,R1.yzxw,R2.zxyw,-R3;
DP3 R3,R0,R3;
```

Example 4

```
% !VS1.0
; R2=matrix[3][3]*v->onrm, normalize and calculate distance vector R3
#define INRM 11; source normal
#define N0 16; inverse transpose modelview row 0
#define N4 17; inverse transpose modelview row 1
#define N8 18; inverse transpose modelview row 2
DP3 R2.x,v[INRM],c[N0];
DP3 R2.y,v[INRM],c[N4];
DP3 R2.z,v[INRM],c[N8];
DP3 R2.w,R2,R2;
RSQ R11.x,R2.w;
MUL R2.xyz,R2,R11.x;
DST R3,R2.w,R11.x;
```

Example 5

```
% !VS1.0
; reduce R1 to fundamental period
#define PERIOD 70; location PERIOD is 1.0/(2*PI),2*PI,0.0,0.0
MUL R0,R1,c[PERIOD].x; divide by period
EXP R4,R0;
MUL R2,R4.y,c[PERIOD].y; multiply by period
```

Example 6

```
% !VS1.0
; matrix[4][4]*v->opos with homogeneous divide
#define IPOS 0; source position
#define M0 20; modelview row 0
#define M4 21; modelview row 1
#define M8 22; modelview row 2
#define M12 23; modelview row 3
DP4 R5.w,v[IPOS],c[M12];
DP4 R5.x,v[IPOS],c[M0];
DP4 R5.y,v[IPOS],c[M4];
DP4 R5.z,v[IPOS],c[M8];
RCP R11,R5.w;
MUL R5,R5,R11;
```

Example 7

```
% !VS1.0
; R4=v->weight.x*R2+(1.0-v->weight.x)*R3
#define IWGT 11; source weight
ADD R4,R2,-R3;
MAD R4,v[IWGT].x,R4,R3;
```

Example 8

```
% !VS1.0
; output transformed position, xform normal/normalize, output two textures
#define IPOS 0; source position
#define INORM 11; source normal
#define ITEX0 3; source texture 0
#define ITEX1 4; source texture 1
#define OTEX0 3; destination texture 0
#define OTEX1 4; destination texture 1
#define N0 16; inverse transpose modelview row 0
#define N4 17; inverse transpose modelview row 1
#define N8 18; inverse transpose modelview row 2
#define C0 24; composite row 0
#define C4 25; composite row 1
#define C8 26; composite row 2
#define C12 27; composite row 3
DP3 R2.x,v[INORM],c[N0];
DP3 R2.y,v[INORM],c[N4];
DP3 R2.z,v[INORM],c[N8];
MOV o[OTEX0],v[ITEX0];
DP3 R2.w,R2,R2;
RSQ R2.w,R2.w;
MUL R2,R2,R2.w; keep for later work
MOV o[OTEX1],v[ITEX1];
DP4 o[HPOS].w,v[IPOS],c[C12];
DP4 o[HPOS].x,v[IPOS],c[0];
DP4 o[HPOS].y,v[IPOS],c[C4];
DP4 o[HPOS].z,v[IPOS],c[C8];
```

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for programmable processing in a computer graphics pipeline, comprising:
   receiving graphics data including texture information; and
   performing programmable operations on the graphics data in order to generate output, wherein the operations are programmable by a user utilizing instructions from a predetermined instruction set;
   wherein the operations include a mathematical operation for altering the texture information of the graphics data;
   wherein the instructions are each carried out using a unique associated method and data structure.

2. The method of claim 1, wherein the graphics data includes vertex data.

3. The method of claim 2, wherein the operations perform vertex processing on the vertex data.

4. The method of claim 1, wherein the graphics data is swizzled.

5. The method of claim 1, wherein the graphics data includes lighting information.

6. The method of claim 1, wherein the graphics data is received in a hardware graphics accelerator.

7. The method of claim 1, wherein the operations are performed on the graphics data utilizing a hardware graphics accelerator.

8. The method of claim 1, wherein the graphics data includes a constant.

9. The method of claim 8, wherein the constant is stored in a constant source buffer.

10. The method of claim 1, wherein each of the operations includes an input and an output which take a form of at least one of a vector and a scalar.

11. The method of claim 1, wherein the predetermined instruction set includes a reciprocal operation, a reciprocal square root operation, a three component dot product operation, a four component dot product operation, a distance operation, a minimum operation, a maximum operation, an exponential operation, and a logarithm operation.

12. The method of claim 11, wherein the exponential operation is an exponential base two (2) operation and the logarithm operation is a logarithm base two (2) operation.

13. The method of claim 11, wherein the distance instruction calculates a distance vector.

14. The method of claim 1, wherein the predetermined instruction set further includes a multiply and addition operation.

15. The method of claim 1, wherein the predetermined instruction set further includes a set on greater or equal than operation.

16. The method of claim 1, wherein the predetermined instruction set further includes an address register load operation.

17. The method of claim 1, wherein the predetermined instruction set further includes a lighting operation.

18. A method for programmable processing in a computer graphics pipeline, comprising:
    receiving graphics data including position coordinates, texture coordinates, lighting values, and skinning weight values; and
    performing programmable operations on the graphics data in order to generate output, wherein the operations are programmable by a user utilizing instructions from a predetermined instruction set;
    wherein the instructions are each carried out using a unique associated method and data structure.

19. A method for programmable processing in a computer graphics pipeline, comprising:
    receiving graphics data including texture information and lighting information; and
    performing programmable operations on the graphics data in order to generate output, wherein the operations are programmable by a user utilizing instructions from a single instruction set;
    wherein the instructions are each carried out using a unique associated method and data structure.

* * * * *